(12) United States Patent
Egawa et al.

(10) Patent No.: US 7,527,326 B2
(45) Date of Patent: May 5, 2009

(54) VEHICLE FLOOR STRUCTURE

(75) Inventors: Yasuhisa Egawa, Sakura (JP); Shigeto Yasuhara, Shioya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/102,299

(22) Filed: Apr. 14, 2008

(65) Prior Publication Data

US 2008/0258506 A1   Oct. 23, 2008

(30) Foreign Application Priority Data

Apr. 20, 2007   (JP) ............................. 2007-111559

(51) Int. Cl.
    *B62D 25/20*   (2006.01)
(52) U.S. Cl. .................. 296/193.07; 296/204; 296/209
(58) Field of Classification Search ............ 296/193.07, 296/181.4, 204, 209
    See application file for complete search history.

(56) References Cited

U.S. PATENT DOCUMENTS 2,380,523 A * 7/1945 Hicks et al. ................. 296/204
7,014,256 B2 * 3/2006 Kamura et al. ......... 296/193.07
7,025,412 B2 * 4/2006 Nakamura et al. ...... 296/193.07
7,195,306 B2   3/2007 Egawa et al.

FOREIGN PATENT DOCUMENTS

EP    1 712 454      10/2006
JP    2006-298076    11/2006
WO   2007-094328    8/2007

* cited by examiner

*Primary Examiner*—Dennis H Pedder
*Assistant Examiner*—Pinel E Romain
(74) *Attorney, Agent, or Firm*—Rankin, Hill & Clark LLP

(57) ABSTRACT

A vehicle floor structure including a floor panel which includes: a plurality of arc beads which are provided on a surface of the floor panel so as to be arranged in parallel with each other and to extend from a side sill inner toward a middle cross member while being bent; and a bracket which is provided in the vicinity of the side sill inner for fixing an auto part, wherein: at least one of the beads in the vicinity of the side sill inner is diverged and connected to the beads at a farther side with respect to the side sill inner; the bracket is fixed so as to cover the bead in the vicinity of the side sill inner; and a farther end portion of the bracket with respect to the side sill inner is fixed so as to straddle the diverged beads.

3 Claims, 8 Drawing Sheets

VEHICLE FLOOR STRUCTURE

BACKGROUND OF THE INVENTION

Priority is claimed on Japanese Patent Application No. 2007-111559, filed on Apr. 20, 2007, the content of which is incorporated herein by reference.

1. Field of the Invention

The invention relates to a vehicle floor structure which is provided with beads, especially a vehicle floor structure which is suitable for mounting an auto part such as a seat or a battery.

2. Description of the Related Art

Conventionally known examples of a vehicle floor structure are provided with beads having a concave-convex surface, in which an intersection of a side sill and a cross member is assigned to a center of the beads arrangement (see, for example, Japanese Unexamined Patent Application, First Publication No. 2006-298076). With the beads, rigidity of a floor panel can remarkably be enhanced while preventing the vehicle body weight from increasing.

According to the above-described conventional technology, although the rigidity of the floor panel can be enhanced due to the beads provided on the floor panel, there is a problem in that it is difficult for an auto part to be mounted on the floor surface because the beads are provided on the surface which is not flat.

In contrast, although it is possible to omit a bead where the auto-part is mounted, there is a problem in that the rigidity of the area where the bead is omitted is deteriorated.

In view of the above-described circumstances, the present invention has an object of providing a vehicle floor structure which can ensure effects of rigidity enhancement of a floor panel itself and the rigidity enhancement for a side vehicular collision due to the presence of beads, while enabling easy mounting of an auto part in the case where the floor panel is provided with the beads.

SUMMARY OF THE INVENTION

In order to achieve the aforementioned object, the present invention employs the following. Namely, the present invention employs a vehicle floor structure including a floor panel which includes: a plurality of arc beads which are provided on a surface of the floor panel so as to be arranged in parallel with each other and to extend from a side sill inner toward a middle cross member while being bent; and a bracket which is provided in the vicinity of the side sill inner for fixing an auto part, wherein: at least one of the beads in the vicinity of the side sill inner is diverged and connected to the beads at a farther side with respect to the side sill inner; the bracket is fixed so as to cover the bead in the vicinity of the side sill inner; and a farther end portion of the bracket with respect to the side sill inner is fixed so as to straddle the diverged beads.

According to the above-described vehicle floor structure, the rigidity of the floor panel can be enhanced since a decrease of the number of beads at a vicinity of the side sill inner compared to those at a farther side from the side sill inner is complemented with the bracket. As a result, it is possible to bear and transmit a collision load applied from the side sill inner reliably.

It may be arranged such that ridgelines of the bracket are respectively continued into outside ridgelines of the diverged beads.

In this case, it is possible to bear a collision load with two lines, that is, each ridgeline of the beads and the bracket when the load is applied at the time of a side vehicular collision. As a result, the collision load can be transmitted efficiently and reliably.

The present invention also employs a vehicle floor structure including a floor panel which includes: a plurality of arc beads which are provided on a surface of the floor panel so as to be arranged in parallel with each other and to extend from a side sill inner toward a middle cross member while being bent; and a bracket which is provided in the vicinity of the side sill inner for fixing an auto part, wherein: at least one of the beads has a single-stream bead portion which extends from the side sill inner and a double-stream portion which is formed by bifurcating a closer end portion of the single-stream bead portion with respect to the middle cross member, and continuously extends toward the middle cross member; the single-stream bead portion is covered with the bracket; each of a foot portion of the bracket is joined to a valley portion of the single-stream bead portion; and ridgelines of a closer end portion of the bracket with respect to the middle cross member are respectively continued into outside ridgelines of the double-stream bead portion.

According to the above-described vehicle floor structure, the bracket and the beads are subjected to a collision load applied to the side sill inner at a single-stream portion, and then some portion of the collision load is directly transmitted from the single-stream portion to a double-stream portion, while others are transmitted from the ridgeline of the bracket to the outside ridgelines of the double-stream portion. Those divided collision loads are summed up and transmitted to the middle cross member. As a result, the rigidity of the floor panel, which itself is reduced for mounting the bracket, is enhanced with the effective use of the bracket.

DETAILED DESCRIPTION OF THE INVENTION

Figure 1:
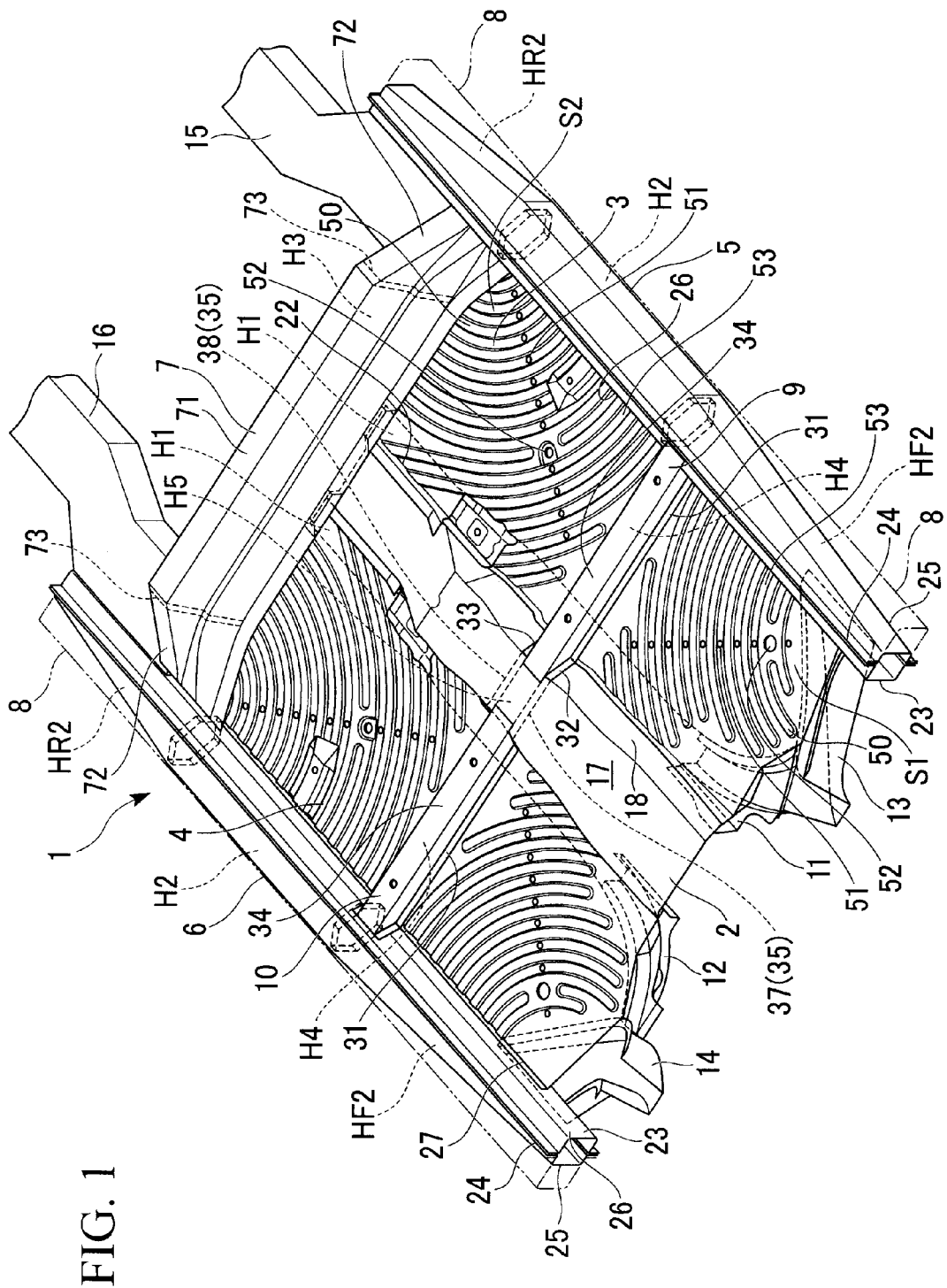
FIG. 1 is a perspective view of an embodiment according to the present invention.
Figure 2:
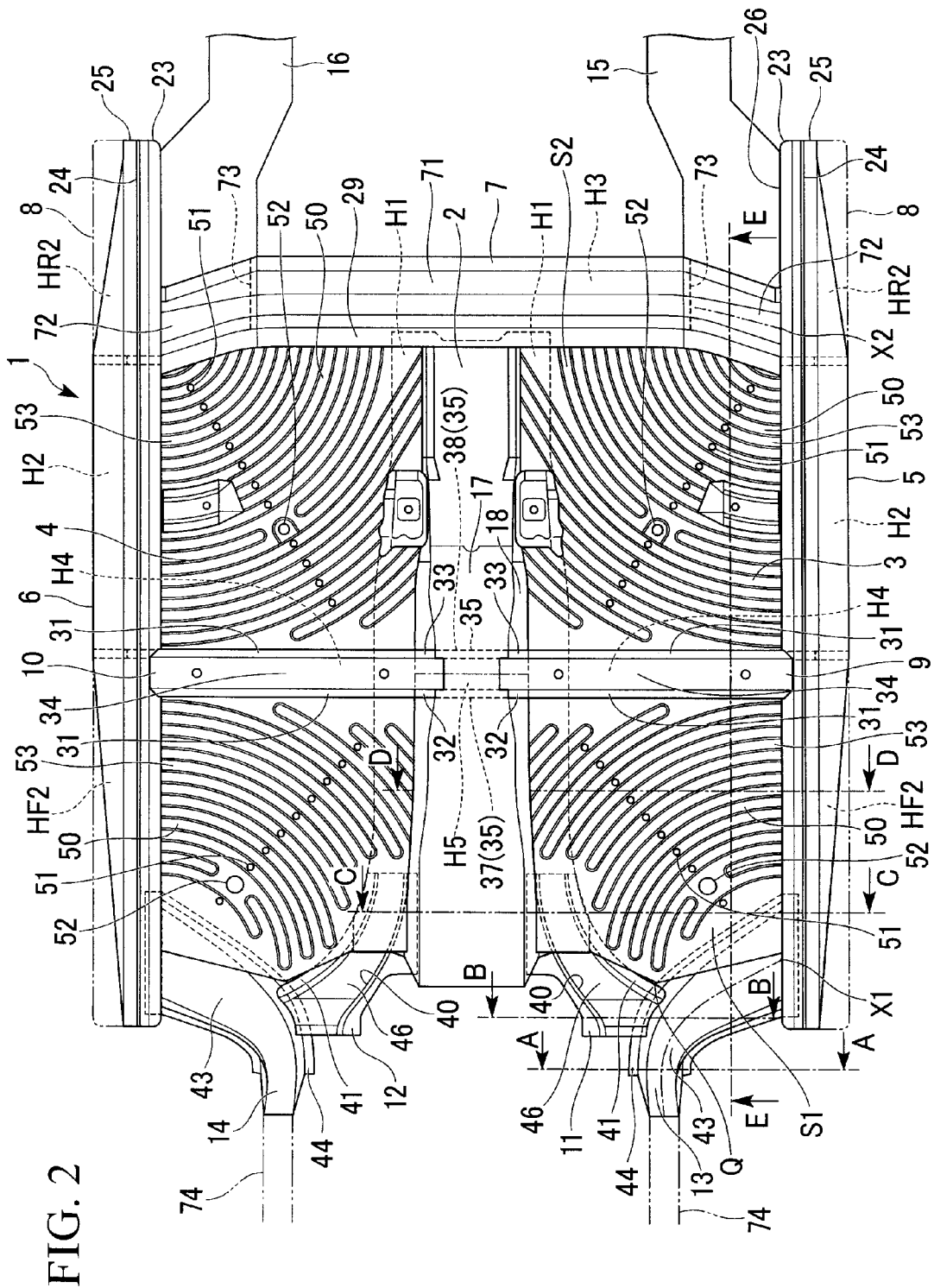
FIG. 2 is a planar view of an embodiment according to the present invention.

An embodiment of the present invention will be described below with reference to the drawings. As shown in FIG. 1 and FIG. 2, in a floor 1 of a vehicle, a floor tunnel frame 2 extending in the longitudinal direction of the vehicle body is formed along a central portion in the vehicle width direction. To both edges of this floor tunnel frame 2, there are joined inside edges of left and right floor panels 3, 4. To outside edges of the left and right floor panels 3, 4, there are fixed left and right side sills 5, 6, which are vehicular frame members extending in the longitudinal direction of the vehicle body. That is, the left and right floor panels 3, 4 are bridged respectively between the floor tunnel frame 2 and the left and right side sills 5, 6. Rear portions of the left and right side sills 5, 6 are connected to each other by means of a middle cross member 7 which is a vehicular frame member arranged in the vehicle width direction. A front edge portion of the middle cross member 7 is joined to rear edges of the left and right floor panels 3, 4. Furthermore, a substantially central portion in the longitudinal direction of the floor tunnel frame 2 is connected to the left and right side sills 5, 6 by means of left and right front cross members 9, 10 arranged in the vehicle width direction, respectively.

On the other hand, to walls of both sides of a front end portion of the floor tunnel frame 2, there are respectively joined one of each end of extensions 11, 12. To front end portions of the left and right side sills 5, 6, there are respectively joined one of each end of outriggers 13, 14. These left and right extensions 11, 12 are respectively connected to inside walls of the outriggers 13, 14. Left and right end portions 47, 47 of the middle cross member 7 are bent in an obliquely forward direction. To rear walls of these left and right end portions 47, 47 and to rear inner walls of the left and right side sills 5, 6, there are connected front end portions of left and right rear side frames 15, 16. The floor panels 3, 4 and the floor tunnel frame 2 are main components of the floor 1.

The left and right extensions 11, 12 and the outriggers 13, 14 which are constructed in this manner function as lateral frame members in that they connect the side sills 5, 6 with the floor tunnel frame 2 in the vehicle width direction.

Figure 3:
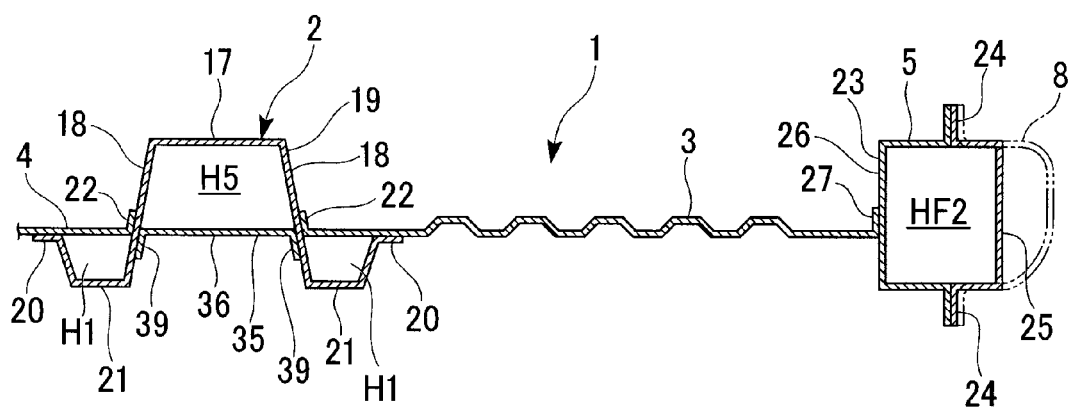
FIG. 3 is a cross-sectional view taken along the D-D line in FIG. 2.

As shown in FIG. 3, the floor tunnel frame 2 is made of a tunnel main body 19 and wing portions 21, 21. The tunnel main body 19 is made of a top wall 17 and two inclined side walls 18, 18 so as to form a convex above floor panels 3, 4. Wing portions 21, 21 extend outwardly from bottom ends of both the inclined side walls of the tunnel main body 19 extending below surfaces of the left and right floor panels 3, 4, and respectively welded onto bottom surfaces of the floor panels 3, 4 in flange portions 20. On the inside edges of the left and right floor panels 3, 4, there are respectively formed flange portions 22 in a rising manner. These flange portions 22 are welded onto both the side walls 18, 18 of the tunnel main body 19 of the floor tunnel frame 2.

That is, outside both the side walls 18, 18 of the floor tunnel frame 2, and below the floor panels 3, 4, there are formed closed section structures H1 formed of the wing portions 21, 21 of the floor tunnel frame 2 and the floor panels 3, 4.

Each of the side sills 5, 6 is made of: a side sill inner 23 formed in a convex shape on the vehicle interior side, that is, in a U-shaped cross-section opening toward the outside; a reinforcement 25; and a side sill outer 8. The reinforcement 25 has a U-shaped cross-section opening toward the inside and is joined to the side sill inner 23 in top and bottom joint flange portions 24, 24 to form a closed section structure. The side sill outer 8 is joined to the joint flange portions 24 to form a closed section structure outside the reinforcement 25. The side sill inner 23 is formed in a linear shape with the same cross-section over substantially all the length. On the other hand, as shown in FIG. 1 and FIG. 2, the reinforcement 25 is made of a front inclined wall 25F and a rear inclined wall 25R which have a more outwardly protruding dimension as they extend respectively from the front and rear ends to the center in the longitudinal direction. These front inclined wall 25F and rear inclined wall 25R form inclined closed section structures HF2, HR2. A maximally protruded, closed section structure H2 in the reinforcement 25 whose protruding dimension to the outside is maximum is formed over a predetermined length in the longitudinal direction of the vehicle body. The maximally protruded, closed section structures H2 are arranged between the middle cross member 7 and the front cross members 9, 10. To inside walls 26 of the side sill inners 23, there are respectively joined flange portions 27 which are formed at outside edges of the left and right floor panels 3, 4 in a rising manner.

Figure 4:
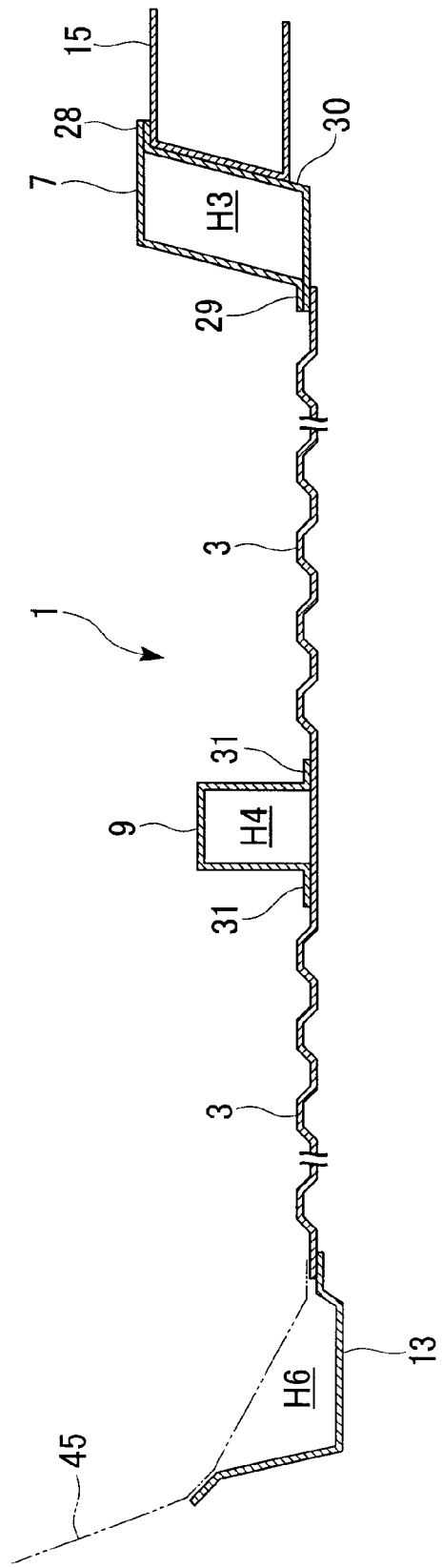
FIG. 4 is a cross-sectional view taken along the E-E line in FIG. 2.

As shown in FIG. 4, the middle cross member 7 is formed of two opposingly arranged members with substantially an L-shaped cross-section, in which rear top edge flange portions 28 of the members are welded onto opposing front bottom edge flange portions 29 of the members, respectively. This middle cross member 7 forms a closed section structure H3 with a substantially rectangular shape, which functions as a vehicle body frame portion, on the top surfaces of the floor panels 3, 4. The front bottom edge flange portions 29 are respectively welded onto the rear edges of the left and right floor panels 3, 4. To a rear wall 30, there are joined front end portions of the left and right rear side frames 15, 16.

The front cross members 9, 10 are members with a hat-shaped cross section opening downwardly. Flange portions 31, 31 at the front and rear of the front cross members 9, 10 are respectively joined to top surfaces of the left and right floor panels 3, 4. As a result, closed section structures H4 are formed as a vehicle body frame portion along the vehicle width direction on the top surfaces of the floor panels 3, 4. Outside ends of the front cross members 9, 10 are joined to side walls 26 which include top walls of the side sill inners 23. On the other hand, in inside ends of the front cross members 9, 10, as shown in FIG. 1 and FIG. 2, a front flange portion 32 and a rear flange portion 33 thereof are joined to an outer surface of the side wall 18 of the floor tunnel frame 2. Furthermore, end edges of top walls 34 of the front cross members 9, 10 are joined to the top wall 17 of the floor tunnel frame 2.

Here, as shown in FIG. 1 through 3, on a backside of the tunnel main body 19 of the floor tunnel frame 2, a joint frame 35 is joined to positions at which the left and right cross members 9, 10 are connected. This joint frame 35 has a hat-shaped cross section that opens upwardly, opposite to the case of the front cross members 9, 10. A bottom wall 36 of the joint frame 35 is aligned with the surfaces of the floor panels 3, 4. A front side flange 37 and rear side flange 38 (see FIG. 1 and FIG. 2) of the joint frame 35 are joined to the backside of the tunnel main body 19. Both of end edges 39, 39 of the bottom wall 36 are joined to the backside of the tunnel main body 19 of the floor tunnel frame 2. Note that the left and right front cross members 9, 10 are omitted in FIG. 3.

As a result, a closed section structure H5 is formed between the joint frame 35 and the floor tunnel frame 2. This closed section structure H5 connects with each of the closed section structures H4 formed between the left and right front cross members 9, 10 and the floor panels 3, 4, to thereby form a substantially continuous vehicle frame member which connects the side sills 5, 6 along the vehicle width direction.

Figure 5:
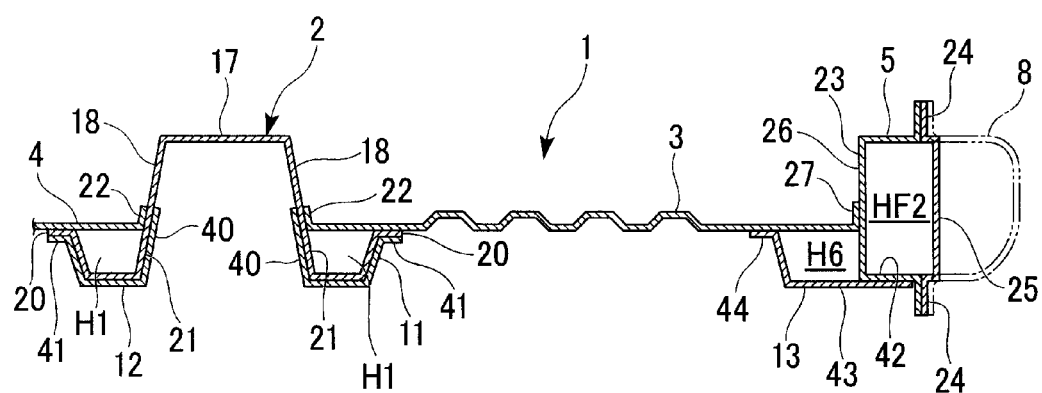
FIG. 5 is a cross-sectional view taken along the C-C line in FIG. 2.

As shown in FIG. 5, one of each end of the left and right extensions 11, 12 is formed in a shape which opens upwardly so as to cover the entire surface of the wing portion 21 of the floor tunnel frame 2 from below. Top ends of inside walls 40 of the left and right extensions 11, 12 are positioned substantially at the same height as those of the flange portions 22 of the floor panels 3, 4. The top ends thereof are joined to back surfaces of the side walls 18 of the tunnel main body 19 of the floor tunnel frame 2. Flange portions 41 on the outside of the other ends of the extensions 11, 12 are joined to the flange portions 20 of the wing portions 21.

The outriggers 13, 14 respectively include: a bottom wall 43 joined to a bottom wall 42 of the respective side sill inners 23, 23; and a rising flange portion 44 joined to the bottom surface of the respective floor panels 3, 4. As a result, the outriggers 13, 14 form closed section structures H6 respectively between the side sills 5, 6 and the floor panels 3, 4.

Figure 6:
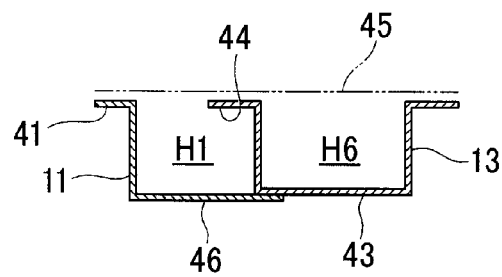
FIG. 6 is a cross-sectional view taken along the B-B line in FIG. 2.
Figure 7:
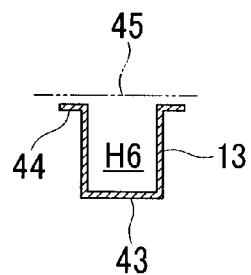
FIG. 7 is a cross-sectional view taken along the A-A line in FIG. 2.

As shown with a double-dotted chain line in FIG. 4, front end portions of the extensions 11, 12 and the outriggers 13, 14 are formed so as to gradually rise forward along a backside surface of a dashboard panel 45 joined to top surfaces of front edges of the floor panels 3, 4. As shown in FIG. 6 and FIG. 7, to the bottom walls 43 of the outriggers 13, 14 whose front side is formed in a hat-shaped cross section, there are respectively joined bottom walls 46 of the extensions 11, 12, and thereby these two are connected.

To a front end of the outrigger 13, there is connected a rear end of a front side frame (not shown in the figure). Note that the double-dotted chain line in FIG. 6 and FIG. 7 shows the dashboard panel 45 which forms the closed section structures H6 respectively between the outriggers 13, 14 and itself, and also forms the closed section structures H1 respectively between the outriggers 13, 14 as well as the extensions 11, 12 and itself.

As shown in FIG. 1 and FIG. 2, on the floor panels 3, 4, there are regularly provided a plurality of wave-formed beads 50 over substantially the entire surface thereof and also provided a plurality of drain holes 51 and a plurality of positioning holes 52. The floor panels 3, 4 are formed in a laterally symmetrical manner with respect to the floor tunnel frame 2. Furthermore, the beads 50, drain holes 51, and positioning holes 52 formed respectively on the floor panels 3, 4 are arranged in a laterally symmetrical manner with respect to the floor tunnel frame 2. Hereunder is a detailed description only of the left floor panel 3. As for the right floor panel, like parts are designated with like reference numerals, and the description thereof is omitted. In the cross-sectional views of FIG. 3 to FIG. 5, a cross-sectional shape of the bead 50, which is a complicated shape, is shown as a simple shape for convenience of illustration in the figures.

In the floor panel 3, the forward part and the backward part across the front cross member 9 are different from each other in the arrangement pattern of the beads 50.

A region S1 in the floor panel 3 which is surrounded by the floor tunnel frame 2, the front cross member 9, the extension 11, and the outrigger 13 has a plurality of the beads 50 provided in a concentric arc-shaped manner at regular intervals, with the center at an intersection X1 of a center of the cross-section of one end of the outrigger 13 and the inside wall 26 of the side sill inner 23. One of each end of the beads 50 extends, starting orthogonally to the inside wall 26 of the side sill inner 23. Some of the other ends of the beads 50 extend so as to be orthogonal to a width direction of the front side frame connected to the outrigger 13.

On the other hand, a region S2 in the floor panel 3 which is surrounded by the floor tunnel frame 2, the front cross member 9, and the middle cross member 7 has a plurality of beads 50 provided in a concentric arc-shaped manner at regular intervals, with the center at an intersection X2 of a center of the cross-section at an end portion on the left side of the middle cross member 7 and the inside wall 26 of the side sill inner 23. One of each end of the beads 50 extends, starting orthogonally to the inside wall 26 of the side sill inner 23. The other ends of the beads 50 extend so as to be orthogonal to the longitudinal direction of the middle cross member 7. The bead 50 is formed by stamping into a trapezoidal shape protruding above a general surface. Between the adjacent beads 50, 50, there is formed a valley portion 53.

A plurality of beads 50 provided in this manner enhance the rigidity of the floor panels 3, 4.

Furthermore, in the forward region S1 further forward than the front cross member 9, the drain holes 51 and the positioning hole 52 are arranged on a diagonal line from a joint portion between the outrigger 13 and the side sill inner 23 to a joint portion between the floor tunnel frame 2 and the front cross member 9. On the other hand, in the backward region S2 further backward than the front cross member 9, the drain holes 51 and the positioning hole 52 are arranged on a diagonal line from a joint portion between the front tunnel frame 2 and the front cross member 9 to a joint point between the middle cross member 7 and the side sill inner 23.

A single drain hole 51 is provided at the center of every valley portion 53 between the adjacent beads 50. These drain holes 51 are for draining electrodeposition solution from the floor panel 3 when the floor panel 3 is taken out of the electrodeposition solution pool in the electrodeposition process for the floor panel 3.

A single positioning hole 52 is provided in each of the regions S1, S2 in the front and at the back of the front cross member 9 in the floor panel 3. Each of the positioning holes 52 is provided at a portion where the peaks of the two adjacent beads 50, 50 are combined.

Figure 8:
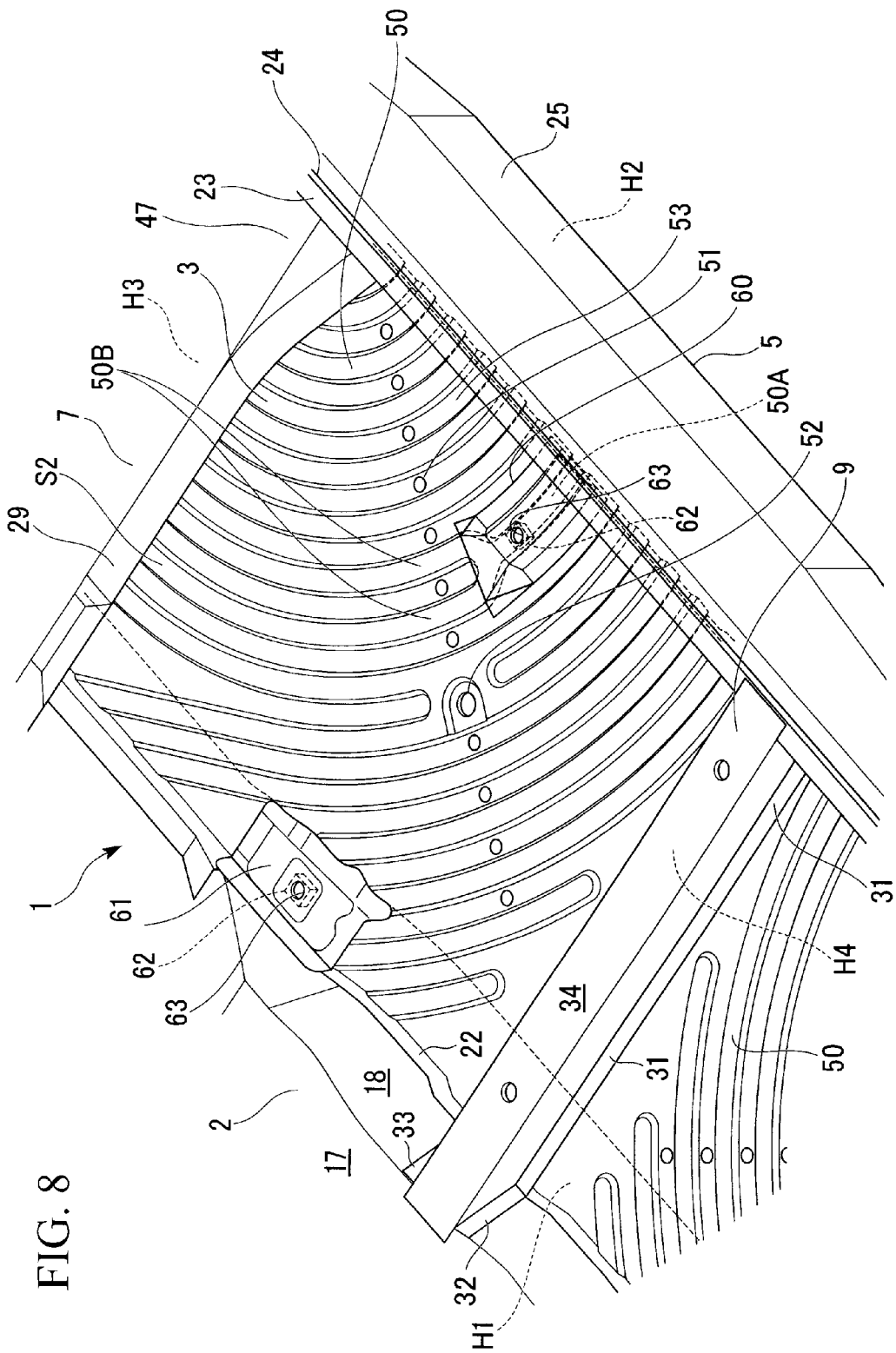
FIG. 8 is an enlarged view of FIG. 2.

As shown in FIG. 8, in the region S2 which is surrounded by the floor tunnel frame 2, the front cross member 9, and the middle cross member 7, an outside bracket 60 and an inside bracket 61 are fixed to the floor panel 3 for supporting a seat (not shown in the figure).

The inside bracket 61, which is a plate-like member formed in a rectangular shape, is joined to a face of the floor panel 3 where the beads 50 are not provided, more specifically, a place which corresponds to the wing portion 21 of the floor tunnel frame 2. A mounting slot 63 in which a weld nut 62 is disposed is formed at the back side of the inside bracket 61.

On the other hand, the outside bracket 60 is fixed to a position further backward and outward than the positioning hole 52.

More specifically, as shown in FIG. 9 through 12, the outside bracket 60 is fixed to where the beads 50 are formed. Because of this, an unique structure for installation is adopted for the outside bracket 60. The floor panel 3 to which the outside bracket 60 is fixed is provided with a plurality of the beads 50, one of each end of which extends from the side sill inner 23 so as to be orthogonal thereto. A single stream bead portion 50A is provided where the outside bracket 60 is fixed, so as to extend from the side sill inner 23. At a farther end portion of the single-stream bead portion 50A with respect to the side sill inner 23, which is closer to the center of the vehicle, double-stream bead portions 50B, 50B are formed such that the farther end portion of the single-stream bead portion 50A is continuously bifurcated into the double-stream bead portions 50B, 50B. Note that the single-stream bead portion 50A and the double-stream bead portions 50B, 50B are constructed in the same manner as the other beads 50, except for the bifurcation, since the specific reference numerals are assigned to the single-stream bead portion 50A and the double-stream bead portions 50B, 50B for differentiation. Also note that the number of beads in the vicinity of the side sill inner 23 is less than that at the farther side therefrom because of the bifurcation structure as mentioned above.

Figure 10:
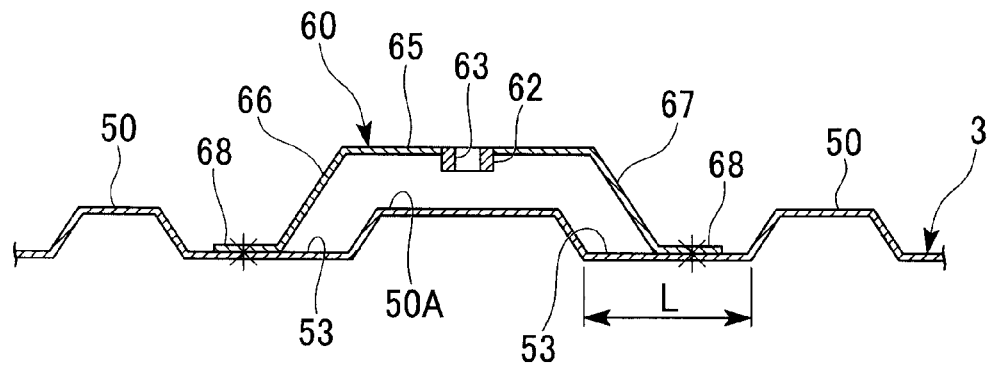
FIG. 10 is a cross-sectional view taken along the F-F line in FIG. 9.
Figure 11:
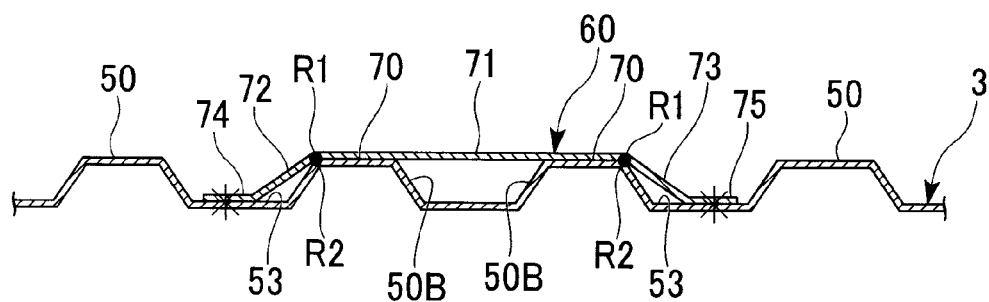
FIG. 11 is a cross-sectional view taken along the G-G line in FIG. 9.

The single-stream bead portion 50A has a larger cross section compared to the other normal beads as shown in FIG. 10, specifically the width dimension L of its valley portion 53 is wider than that of the other normal beads 50.

The outside bracket 60 is provided so as to cover the single-stream bead portion 50A from the above. Beside that, the farther end portion of the outside bracket 60 with respect to the side sill inner 23 straddles the double-stream bead portions 50B, 50B.

On the backside surface of a top wall portion 65 of the outside bracket 60, there is provided the weld nut 62, which constitutes the mounting slot for a seat.

The outside bracket 60 includes a front inclined wall 66 and a rear inclined wall 67 at the front edge and the rear edge of the top wall portion 65, respectively. On the front inclined wall 66 and the rear inclined wall 67, there are horizontally formed foot portions 68, 68, respectively. Each of the foot portions 68, 68 is joined to the valley portion 53 of the single-stream bead portion 50A by spot welding.

Figure 12:
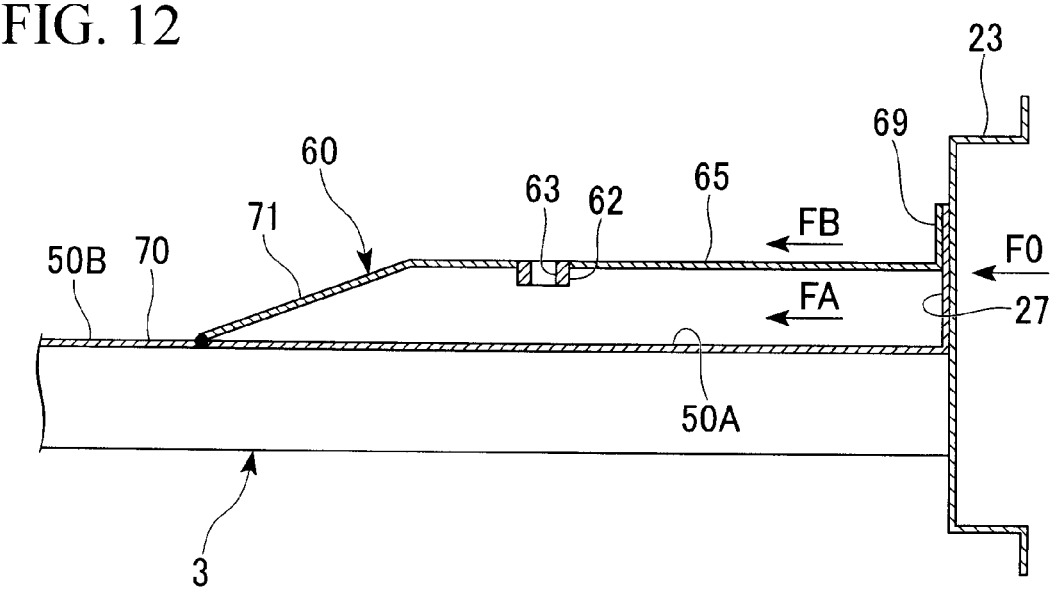
FIG. 12 is a cross-sectional view taken along the H-H line in FIG. 9.

As shown in FIG. 12, a flange portion 69 is formed so as to extend vertically from the near end of the outside bracket 60 with respect to the side sill inner 23. The flange portion 69 is positioned at each edge of the floor panel 3, and is joined to the flange portion 27 which is joined to the side sill inner 23.

At the farther end portion of the top wall portion 65 of the outside bracket 60 with respect to the side sill inner 23, there is provided an inclined portion 71 which is inclined toward top walls 70, 70 of the double-stream bead portions 50B, 50B. On the front edge and the rear edge of the inclined portion 71, there are respectively formed a front inclined portion 72 and a rear inclined portion 73 which are slightly bent. On the front inclined portion 72 and the rear inclined portion 73, there are respectively formed a front foot portion 74 and a rear foot portion 75. The front foot portion 74 and the rear foot portion 75 are respectively joined to the outer valley portions 53, 53 of the double-stream bead portion by spot welding. Here, the farther side edge of the inclined portion 71 with respect to the side sill inner 23 is aligned with the top walls 70, 70 of the double-stream bead portions 50B, 50B. A ridgeline R1 between the inclined portion 71 and the front inclined portion 72 and another ridge line R1 between the inclined portion 71 and the rear inclined portion 73 are formed so as to respectively continue into outside ridgelines R2, R2 of the double-stream bead portions 50B, 50B.

Here, the end of the ridgeline R1 between the inclined portion 71 and the rear inclined portion 73 and one of the ridgelines R2, R2 of the double-stream bead portions 50B, 50B are joined by MIG welding. Similarly, the end of the ridgeline R1 between the inclined portion 71 and the front inclined portion 72 and the other ridgeline R2 of the double-stream bead portions 50B, 50B are joined by MIG welding.

Figure 9:
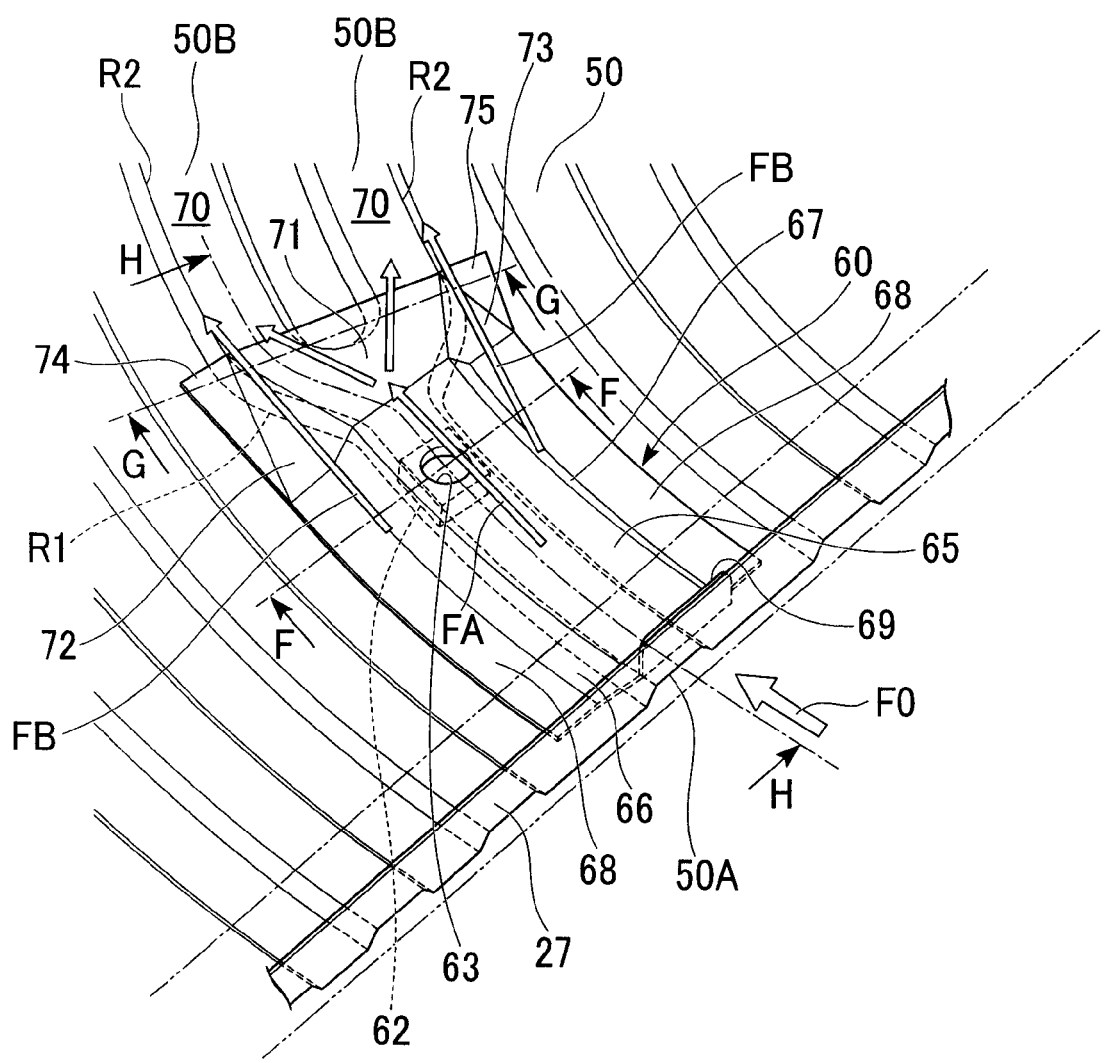
FIG. 9 is an enlarged view of a main part of FIG. 2.

According to the above-described embodiment, as shown in FIG. 9 and 12, when a collision load (shown as an arrow F0 in the figures) is applied to the side sill 5 at the time of a side vehicular collision, the collision load F0 acts on the floor panel 3 from the side sill inner 23 via the flange portion 27. Some portion of the collision load F0 which is applied from the flange portion 27 of the floor panel 3 acts on the single-stream bead portion 50A toward the vehicle interior side as a load FA, and then the load FA is transmitted from the single-stream bead portion 50A to the double-stream bead portions 50B, 50B into which the bifurcated end of the single-stream bead portion 50A continues. For this reason, since the applied load is dispersed on each of the double-stream bead portions 50B, 50B, the floor structure of the present invention is advantageous in this regard.

On the other hand, the other portion of the collision load F0 acts on the outside bracket 60 from the flange portion 27, and is transmitted to the front inclined portion 72 and the rear inclined portion 73 via the top wall portion 65, the inclined portion 71, the front inclined wall 66 and the rear inclined wall 67, and is further transmitted as two separate loads FB to the double-stream bead portions 50B, 50B, in which the ridgelines R1, R1 of the outside bracket 60 are respectively aligned with the outside ridgelines R2 of the double-stream bead portions 50B, 50B.

According to the above-described structure, it is possible to reinforce the floor panel 3 with the outside bracket 60 despite the single-stream bead portion 50A being provided on the floor panel 3 with a reduced number of beads. More specifically, since the single-stream bead portion 50A and the outside bracket 60 can bear a collision load, the rigidity of the floor panel 3 can be enhanced. As a result, with the above-described structure, it is possible to bear and transmit the collision load F0 which is applied to the side sill inner 23 at the time of a side vehicular collision.

More specifically, when the collision load F0 which is applied to the side sill inner 23 acts on the beads 50, the single-stream bead portion 50A and the outside bracket 60 bear the load at the area where the single-stream bead portion 50A is provided, and then some portion of the load is directly transmitted from the single-stream portion 50A to the double-stream bead portions 50B, 50B, and the other portion of the load is transmitted from the ridgelines R1, R1 of the outside bracket 60 to the outside ridgelines R2, R2 of the double-stream bead portions 50B, 50B, respectively. Finally those divided loads are summed up and transmitted to the middle cross member 7 via the double-stream bead portions 50B, 50B. As a result, with the effective use of the bracket, it is possible not only to enhance the rigidity of the floor panel 3 which undergoes deterioration of the rigidity due to the limitation of the beads arrangement for fixing the outside bracket 60, but also to enhance the transmission efficiency of the collision load.

As has been described above, the present invention enables the effects of the rigidity enhancement of the floor panels 3, 4 and the rigidity enhancement for a side vehicular collision due to the presence of the beads 50 to be ensured, while enabling easy mount of an auto part such as a seat in the case where the floor panels 3, 4 are provided with the beads 50.

Note that the present invention is not limited to the above-described embodiment. In the above-described embodiment, the bracket for mounting a seat has been explained, but the bracket can be applicable for mounting a battery to drive an electric vehicle or a hybrid vehicle. In addition, the cross section of each bead is a trapezoidal shape in the embodiment, but the cross section can be a semicircular or triangle shape. Furthermore, the single-stream bead portion is bifurcated to continuously form the double-stream portion, but the single-stream bead portion can be divided into three streams or more.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle floor structure comprising a floor panel which includes:
    a plurality of arc beads which are provided on a surface of the floor panel so as to be arranged in parallel with each other and to extend from a side sill inner toward a middle cross member while being bent; and
    a bracket which is provided in the vicinity of the side sill inner for fixing an auto part, wherein:

at least one of the beads in the vicinity of the side sill inner is diverged at a farther side with respect to the side sill inner;

the bracket is fixed so as to cover the bead in the vicinity of the side sill inner; and a farther end portion of the bracket with respect to the side sill inner is fixed so as to straddle the diverged beads.

2. The vehicle floor structure according to claim 1, wherein ridgelines of the bracket are respectively continued into outside ridgelines of the diverged beads.

3. A vehicle floor structure comprising a floor panel which includes:

a plurality of arc beads which are provided on a surface of the floor panel so as to be arranged in parallel with each other and to extend from a side sill inner toward a middle cross member while being bent; and a bracket which is provided in the vicinity of the side sill inner for fixing an auto part, wherein:

at least one of the beads has a single-stream bead portion which extends from the side sill inner and a double-stream portion which is formed by bifurcating the single-stream bead portion toward the middle cross member, and continuously extends toward the middle cross member;

the single-stream bead portion is covered with the bracket;

each of a foot portion of the bracket is joined to a valley portion of the single-stream bead portion; and ridgelines of a closer end portion of the bracket with respect to the middle cross member are respectively continued into outside ridgelines of the double-stream bead portion.

* * * * *